(12) United States Patent
Koh et al.

(10) Patent No.: US 11,535,395 B2
(45) Date of Patent: Dec. 27, 2022

(54) AERONAUTICAL LIGHT AID FOR VERTICAL TAKEOFF AND LANDING

(71) Applicant: KOREA AIRPORTS CORPORATION, Seoul (KR)

(72) Inventors: Dong Hee Koh, Seoul (KR); Min Chul Jung, Seoul (KR); Keum Sik Yu, Seoul (KR); Hyung Kyu Woo, Seoul (KR)

(73) Assignee: KOREA AIRPORTS CORPORATION, Seoul (KR)

( * ) Notice: Subject to any disclaimer, the term of this patent is extended or adjusted under 35 U.S.C. 154(b) by 0 days.

(21) Appl. No.: 17/237,057

(22) Filed: Apr. 22, 2021

(65) Prior Publication Data

US 2022/0033105 A1 Feb. 3, 2022

(30) Foreign Application Priority Data

Jul. 28, 2020 (KR) .................. 10-2020-0093585

(51) Int. Cl.
*B64F 1/20* (2006.01)
*F21V 5/00* (2018.01)
(Continued)

(52) U.S. Cl.
CPC .............. *B64F 1/205* (2013.01); *F21V 5/008* (2013.01); *F21V 9/40* (2018.02); *B64D 45/04* (2013.01); *B64D 45/08* (2013.01); *B64F 1/007* (2013.01); *B64F 1/18* (2013.01); *B64F 1/20* (2013.01); *F21S 8/022* (2013.01); *F21V 9/08* (2013.01); *F21V 9/083* (2013.01); *F21V 9/12* (2013.01); *F21V 9/20* (2018.02); *F21V 9/30* (2018.02); *F21V 9/35* (2018.02); *F21V 9/38* (2018.02); *F21W 2111/06* (2013.01)

(58) Field of Classification Search
CPC ....... F21W 2111/06; B64F 1/007; B64F 1/18; B64F 1/20; B64F 1/205; F21V 9/08; F21V 9/083; F21V 9/12; F21V 9/20; F21V 9/30; F21V 9/35; F21V 9/38; F21V 9/40; B64D 45/04; B64D 45/08
See application file for complete search history.

(56) References Cited

U.S. PATENT DOCUMENTS 2,498,294 A * 2/1950 Burns .................. F21V 9/08
353/42
3,138,779 A * 6/1964 Murray, Jr. .......... F21V 21/00
340/955

(Continued)

FOREIGN PATENT DOCUMENTS

| GB | 2458197 A | * | 9/2009 | ........... B64F 1/20 |
| JP | H1012009 | | 1/1998 | |
| KR | 200332870 Y1 | * | 11/2003 | ........... B64F 1/20 |
| KR | 20160009141 | | 1/2016 | |
| KR | 20170006798 | | 1/2017 | |
| KR | 20170103186 A | * | 9/2017 | ........... B64F 1/007 |
| KR | 102101283 B1 | * | 4/2020 | ........... B64D 45/04 |
| KR | 20200082271 A | * | 7/2020 | ........... B64D 45/04 |

*Primary Examiner* — Colin J Cattanach
(74) *Attorney, Agent, or Firm* — JCIPRNET (57) ABSTRACT

An aeronautical light aid for a vertical takeoff and landing (VTOL) flying object is provided. The aeronautical light aid includes a plurality of first lighting portions buried in a takeoff and landing port and configured to radiate light in a vertically upward direction, a plurality of second lighting portions provided on an outer side of the takeoff and lighting port and configured to radiate light in an externally upward direction, and a landing guide provided at the center of the takeoff and landing port.

7 Claims, 6 Drawing Sheets

(51) Int. Cl.
*F21V 9/40* (2018.01)
*F21W 111/06* (2006.01)
*F21S 8/02* (2006.01)
*B64D 45/04* (2006.01)
*F21V 9/08* (2018.01)
*F21V 9/20* (2018.01)
*B64F 1/18* (2006.01)
*F21V 9/30* (2018.01)
*F21V 9/38* (2018.01)
*B64F 1/00* (2006.01)
*F21V 9/35* (2018.01)
*B64D 45/08* (2006.01)
*F21V 9/12* (2006.01)

(56) References Cited

U.S. PATENT DOCUMENTS

| | | | | |
|---|---|---|---|---|
| 4,430,695 | A * | 2/1984 | Payne | B64F 1/20 362/240 |
| 7,023,361 | B1 * | 4/2006 | Wallace | B64F 1/205 340/952 |
| 8,434,905 | B2 * | 5/2013 | Tian | B64F 1/20 362/249.02 |
| 2015/0022379 | A1 * | 1/2015 | Lewis | B64F 1/007 340/946 |
| 2019/0248511 | A1 * | 8/2019 | Lewis | H05B 45/00 |
| 2020/0073412 | A1 * | 3/2020 | McNair | G05D 1/102 |

* cited by examiner

AERONAUTICAL LIGHT AID FOR VERTICAL TAKEOFF AND LANDING

CROSS-REFERENCE TO RELATED APPLICATION(S)

This application claims the benefit under 35 USC § 119(a) of Korean Patent Application No. 10-2020-0093585 filed on Jul. 28, 2020, in the Korean Intellectual Property Office, the entire disclosure of which is incorporated herein by reference for all purposes.

BACKGROUND

1. Field

One or more example embodiments relate to an aeronautical light aid for a vertical takeoff and landing (VTOL) flying object that is installed on a rooftop of a building to aid a VTOL flying object in safely taking off and landing.

2. Description of Related Art

Worldwide urbanization has brought some urban problems such as a rapid decrease in mobility efficiency of urban residents and an intensified environmental pollution, and has increased social costs for distribution and transport. Amid this situation, urban air mobility (UAM) has been proposed as a future alternative to transportation. The UAM refers to a technology that enables movements in an urban area without a runway by employing electric vertical takeoff and landing (eVTOL). The commercialization of such a technology may be a solution to increasing long-time movements and worsening traffic congestions, and may also change a paradigm of a means of transportation of humans that have moved only on the ground. That is why each government is encouraging the development of a UAM project. The Korean government is also promoting a stepwise demonstration project for the development of the UAM by reorganizing related laws and institutions, for example.

However, the construction of infrastructure for the UAM needs to precede the commercialization of the UAM. In particular, there is required the construction of a takeoff and landing site used in a takeoff and landing phase to which a great portion of aircraft-related safety accidents is related.

The takeoff and landing site may need to be equipped with a light system or facility that visually aids an aircraft in the takeoff and landing phase. However, an existing aeronautical light system or facility may be optimized mainly for a flying object that takes off and lands using a runway, and thus may not apply to a VTOL flying object.

For example, an existing flying object that lands on a runway may determine whether a landing approach angle is optimal using a precision approach path indicator (PAPI) while using information from an instrument panel. The PAPI refers to a light installed on an outer side of a runway to indicate whether a landing approach angle of an aircraft that is to land is optimal or not. In general, four boxes are installed on each of a left side and a right side of a runway, or two boxes of a simplified form are installed on each of the sides. A pilot of an aircraft may thereby visually identify whether an approach angle of the aircraft is optimal based on information associated with a quantity of a red light source and a white light source. However, the PAPI may not provide such visual information to a VTOL flying object when it descends or lands vertically.

In addition, although an existing aeronautical light system installed on a runway has sufficient space for installing a lighting facility, a landing port used by a VTOL flying object may have a relatively small or narrow space. Thus, there needs an aeronautical light system having a structure or composition that is simple enough to be installed even in a small or narrow space. However, there has not been such a system or facility up to the present time.

A VTOL flying object may be basically equipped with a global positioning system (GPS) to receive therefrom latitude, longitude, and altitude information to use it for takeoff and landing. However, a GPS signal may have a severe information distortion due to the influence of ambient waves.

Thus, there is a desire for an aeronautical light system or facility that is available for a VTOL flying object and compensates for the instability of a GPS device.

The above description has been possessed or acquired by the inventor(s) in the course of conceiving the present disclosure and is not necessarily an art publicly known before the present application is filed.

SUMMARY

An aspect provides an aeronautical light aid for a vertical takeoff and landing (VTOL) flying object to aid the VTOL flying object in safely landing.

Aspects to be achieved according to example embodiments described herein are not limited to the foregoing aspect, and other aspects may be clearly understood by one of ordinary skill in the art from the following description.

According to an example embodiment, there is provided an aeronautical light aid for a VTOL flying object.

The aeronautical light aid may include a plurality of first lighting portions buried in a takeoff and landing port and configured to radiate light in an upward direction, a plurality of second lighting portions provided outside the takeoff and landing port and configured to radiate light in an externally upward direction, and a landing guide provided at the center of the take-off and landing port.

Each of the first lighting portions and the second lighting portions may include a lamp body, a light source provided in the lamp body and configured to radiate light, a filter disposed in front of the light source and configured to perform filtering on light generated from the light source, a first lens disposed in front of the filter and configured to allow light obtained through the filtering to transmit, and a second lens disposed in front of the first lens in a traveling direction of the light.

The filter may include a green filter and a red filter to simultaneously provide green light and red light.

The green filter and the red filter may be disposed on the same plane to equally divide in half the light generated from the light source.

The first lighting portions may be installed such that red light is exposed to the flying object when a first angle is greater than or equal to a preset angle and green light is exposed to the flying object when the first angle is less than or equal to the preset angle. The first angle may be formed between a horizontal plane and a straight line connecting the flying object and the first lighting portions when the flying object is located above the takeoff and landing port.

The first lighting portions may be arranged in a circle with the landing guide being at the center thereof.

The second lighting portions may be installed such that green light is exposed to the flying object when a second angle is greater than or equal to a preset angle and red light is exposed to the flying object when the second angle is less than or equal to the preset angle. The second angle may be formed between the horizontal plane and a straight line connecting the flying object and the second lighting portions when the flying object is located above outside the takeoff and landing port.

The second lighting portions may be disposed by being buried along a circumference of the takeoff and landing port, and configured to protrude from the ground or be received to the ground based on an angle at which the flying object approaches.

The landing guide may include a dead center mark formed at a center point of the takeoff and landing port, and a takeoff and landing site indicating mark formed around the dead center mark and configured to visually indicate the center of the takeoff and landing port.

The flying object may include a detector. When the dead center mark is recognized by the detector, the landing guide may guide the flying object to land at the center of the takeoff and landing port.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Hereinafter, example embodiments will be described in detail with reference to the accompanying drawings. It should be understood, however, that there is no intent to limit this disclosure to the particular example embodiments disclosed. On the contrary, example embodiments are to cover all modifications, equivalents, and alternatives falling within the scope of the example embodiments.

The terminology used herein is for the purpose of describing particular example embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In the description of example embodiments, a detailed description of well-known related structures or functions will be omitted when it is deemed that such description will cause an ambiguous interpretation of the present disclosure.

In addition, terms such as first, second, A, B, (a), (b), and the like may be used herein to describe components. Each of these terminologies is not used to define an essence, order, or sequence of a corresponding component but used merely to distinguish the corresponding component from other component(s). It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

Hereinafter, example embodiments will be described in detail with reference to the accompanying drawings. Regarding the reference numerals assigned to the elements in the drawings, it should be noted that the same elements will be designated by the same reference numerals, wherever possible, even though they are shown in different drawings.

Figure 1:
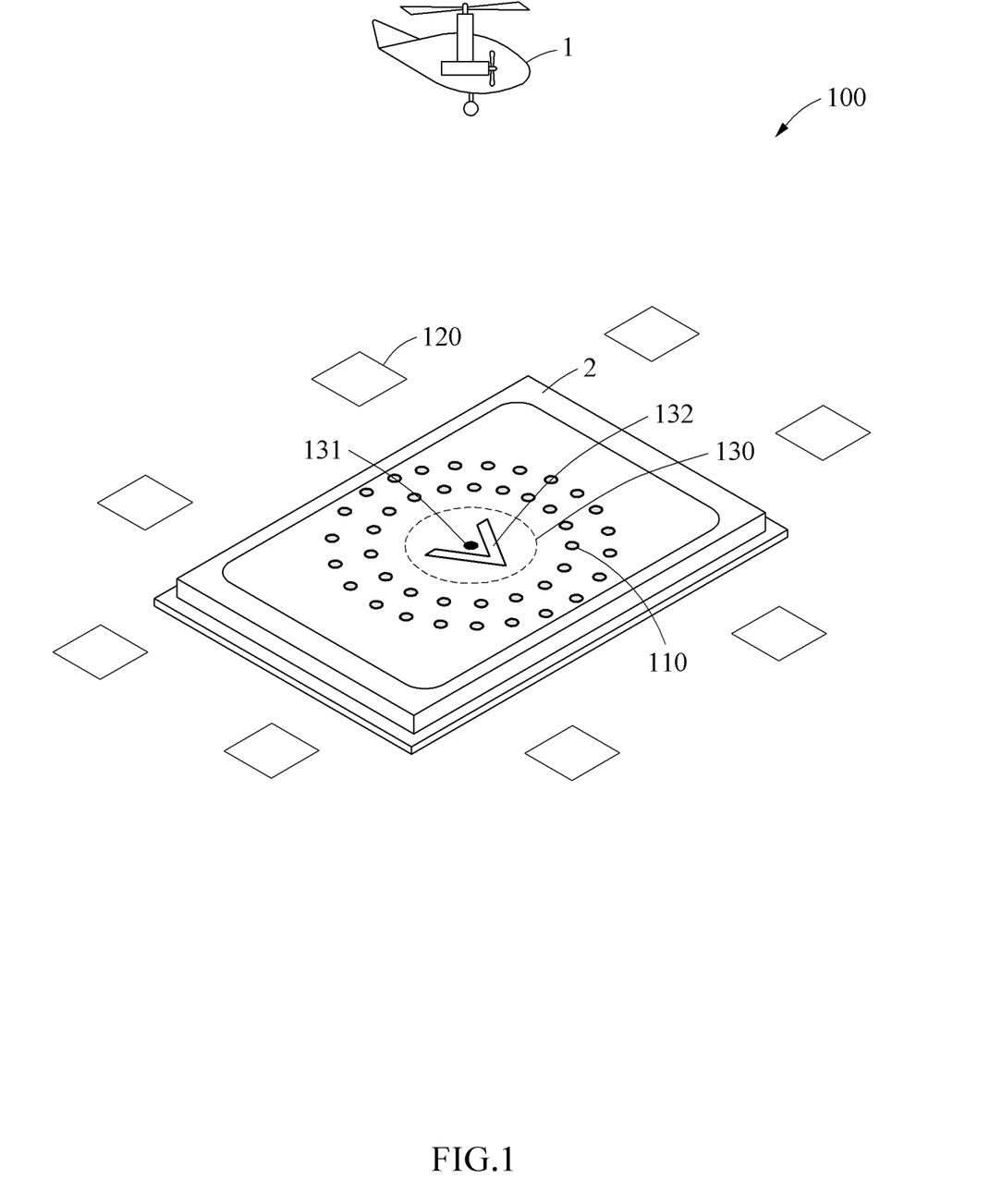
FIG. 1 is a perspective view of an example of an aeronautical light aid for a vertical takeoff and landing (VTOL) flying object according to an example embodiment.

FIG. 1 is a perspective view of an example of an aeronautical light aid for a vertical takeoff and landing (VTOL) flying object according to an example embodiment.

Referring to FIG. 1, an aeronautical light aid 100 for a VTOL flying object (hereinafter simply a "light aid" 100) is installed at a takeoff and landing port 2 for a VTOL flying object 1. The light aid 100 may visually inform a pilot of the VTOL flying object 1 of whether an approach angle and an altitude are at their appropriate levels. The VTOL flying object 1 may include, for example, a helicopter, a drone, an electric VTOL (eVTOL) aircraft, and the like that may take off and land vertically.

The VTOL flying object 1 may land by verifying whether two sets of information—altitude information indicated in a global positioning system (GPS) and the color of a lighting portion—match each other.

The light aid 100 includes a first lighting portion 110, a second lighting portion 120, and a landing guide 130.

The first lighting portion 110 may be provided as a plurality of first lighting portions 110 buried on the surface of the takeoff and landing port 2 and configured to provide visual information to the VTOL flying object 1 that is vertically descending or ascending.

The first lighting portions 110 may be disposed in a form of a circle based on a dead center mark 131 which is the center of the takeoff and landing port 2, and disposed on a plurality of concentric circles. Although the first lighting portions 110 are illustrated as being disposed in a form of a circle in the takeoff and landing port 2, it is merely an example. Thus, the position at which the first lighting portions 110 are installed and the number of the first lighting portions 110 to be installed may change in various ways according to the design.

The second lighting portion 120 may be provided as a plurality of second lighting portions 120 buried outside the takeoff and landing port 2, and configured to provide visual information to the VTOL flying object 1 that is vertically descending or ascending.

The number of the second lighting portions 120, an arrangement distance between the second lighting portions 120, and the position at which the second lighting portions 120 are installed are illustrated in a simplified way, and thus examples of which are not limited to the illustration.

The landing guide 130 may be provided at the center of the takeoff and landing port 2 and provide a landing point to the VTOL flying object 1 that is vertically descending. The landing guide 130 includes the dead center mark 131 and a takeoff and landing site identifying mark 132.

The shape of the landing guide 130 is illustrated in a simplified way, and it is not limited to the illustrated shape.

Figure 2:
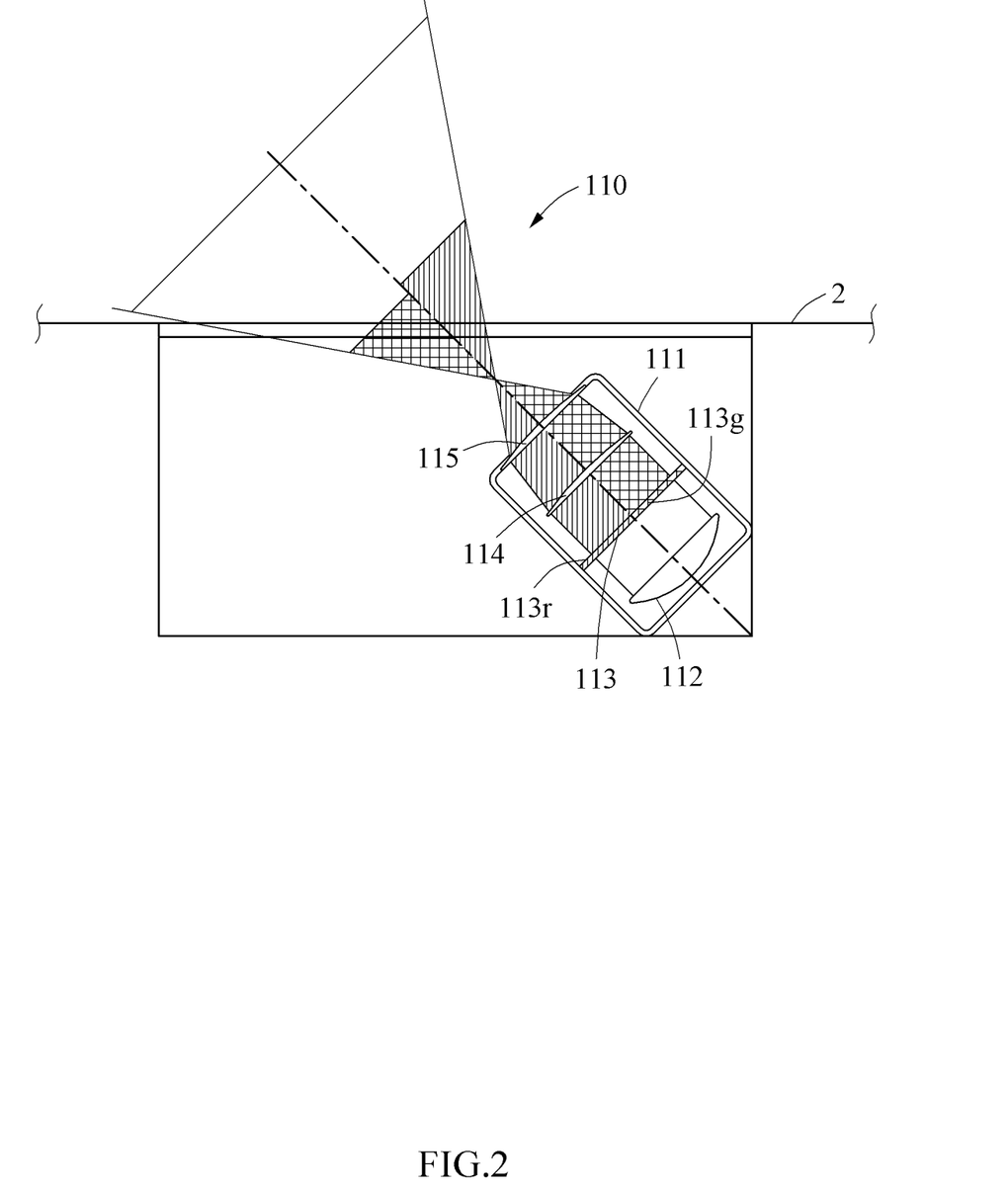
FIG. 2 is a diagram illustrating an example of a first lighting portion according to an example embodiment.

FIG. 2 is a diagram illustrating the first lighting portion 110 according to an example embodiment.

The first lighting portion 110 may be buried in the takeoff and landing port 2 such that it does not interfere with the VTOL flying object 1 when the VTOL flying object 1 vertically takes off and lands, and configured to radiate red light and green light in a vertically upward direction of the dead center mark 131. In addition, the first lighting portion 110 may be installed to radiate light towards the vertically upward direction of the dead center mark 131, in order to provide altitude information to the VTOL flying object 1 that is vertically descending. The first lighting portion 110 includes a lamp body 111, a light source 112, a filter 113, a first lens 114, and a second lens 115. The filter 113 includes a red filter 113*r* and a green filter 113*g*.

The lamp body 111 may be a case in a form having an inner space, for example, in a cylindrical form.

An angle formed between an axis of the lamp body 111 and a plane of the takeoff and landing port 2 may be arbitrarily adjusted based on an angle value in a stable approach altitude range that is based on a surrounding environment.

The first lighting portion 110 may further include a wiring (not shown) and an electrical device (not shown) to provide power to the light source 112 and a measuring device (not shown) that are present inside the lamp body 111.

The light source 112 may be installed inside the light source 112 to output light outward when it operates.

The filter 113 includes the red filter 113*r* and the green filter 113*g*. The red filter 113*r* and the green filter 113*g* may convert light radiated from the light source 112 to red light and green light. The light may be divided into the red light and the green light by a centerline of the lamp body 111 to be radiated.

Although the red filter 113*r* and the green filter 113*g* are illustrated, examples are not limited thereto.

The first lens 114 and the second lens 115 may refract the red light and the green light obtained through the converting to diffuse them. While the light passing through the first lens 114 and the second light 115 are being diffused based on a central axis, the light may be divided into a red light space and a green light space by the central axis of the first lens 114 and the second lens 115.

For example, when a pilot of the VTOL flying object 1 approaching the red light space views a lighting portion, the pilot may recognize red. When the pilot of the VTOL flying object 1 approaching the green light space views the lighting portion, the pilot may recognize green. In addition, the size of respective areas of such red light exposing space and green light exposing space may be adjusted based on an angle formed between a center axis adjusted by a user and the ground.

Figure 3:
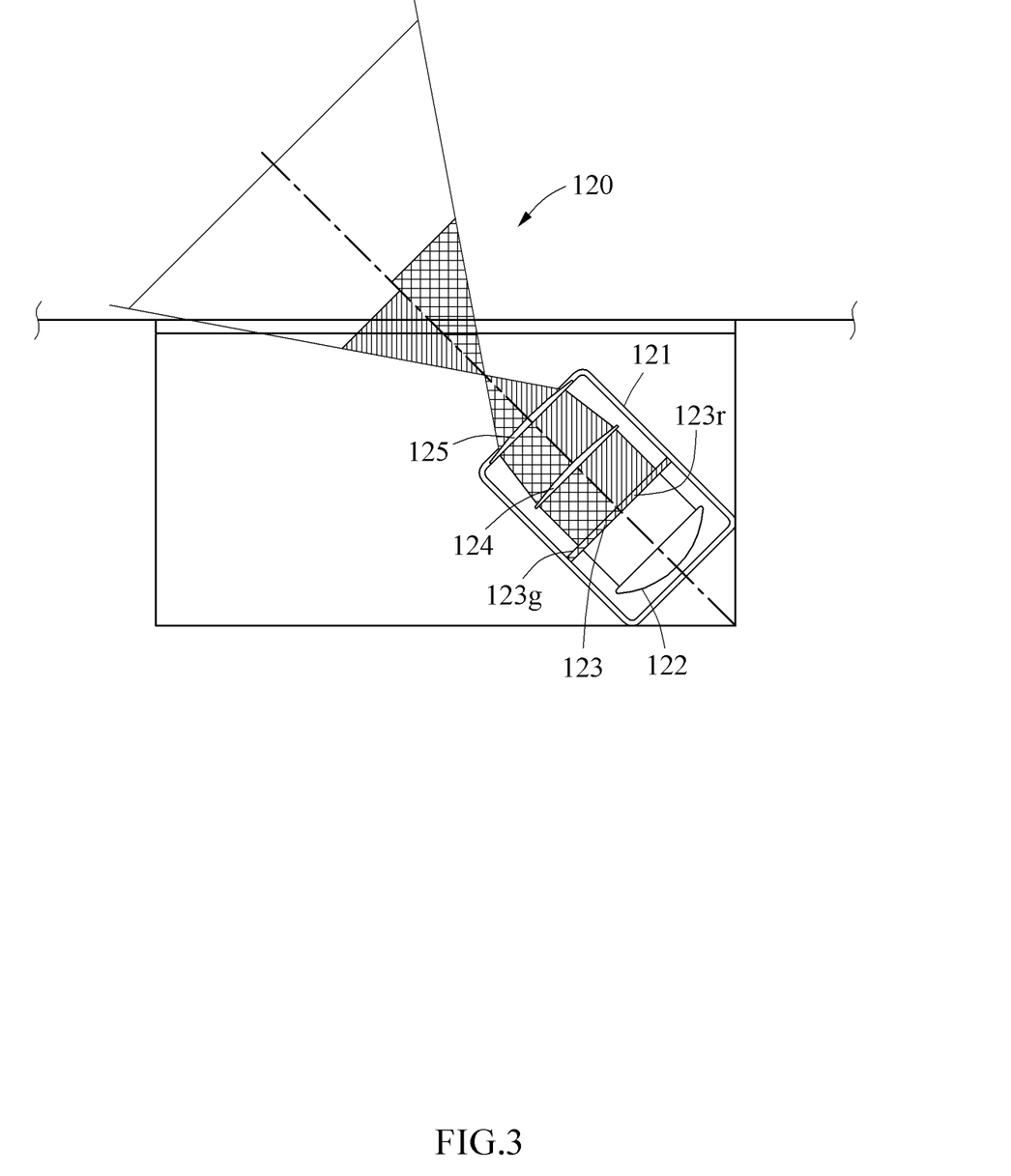
FIG. 3 is a diagram illustrating an example of a second lighting portion according to an example embodiment.

FIG. 3 is a diagram illustrating the second lighting portion 120 according to an example embodiment.

The second lighting portion 120 may be buried outside the takeoff and landing port 2 and configured to radiate red light and green light in an externally upward direction.

The second lighting portion 120 includes a lamp body 121, a light source 122, a filter 123, a first lens 124, and a second lens 125. The second lighting portion 120 may include the substantially same components as the first lighting portion 110, and thus repeated descriptions of the components will be omitted here for brevity.

The second lighting portion 120 may be provided by being buried on the ground, or with a height thereof being adjustable as needed. For example, the second lighting portion 120 may protrude from the ground by a predetermined height to indicate an optimal altitude based on a direction in which the VTOL flying object 1 approaches, and be received into the ground while the VTOL flying object 1 is landing.

Figure 4:
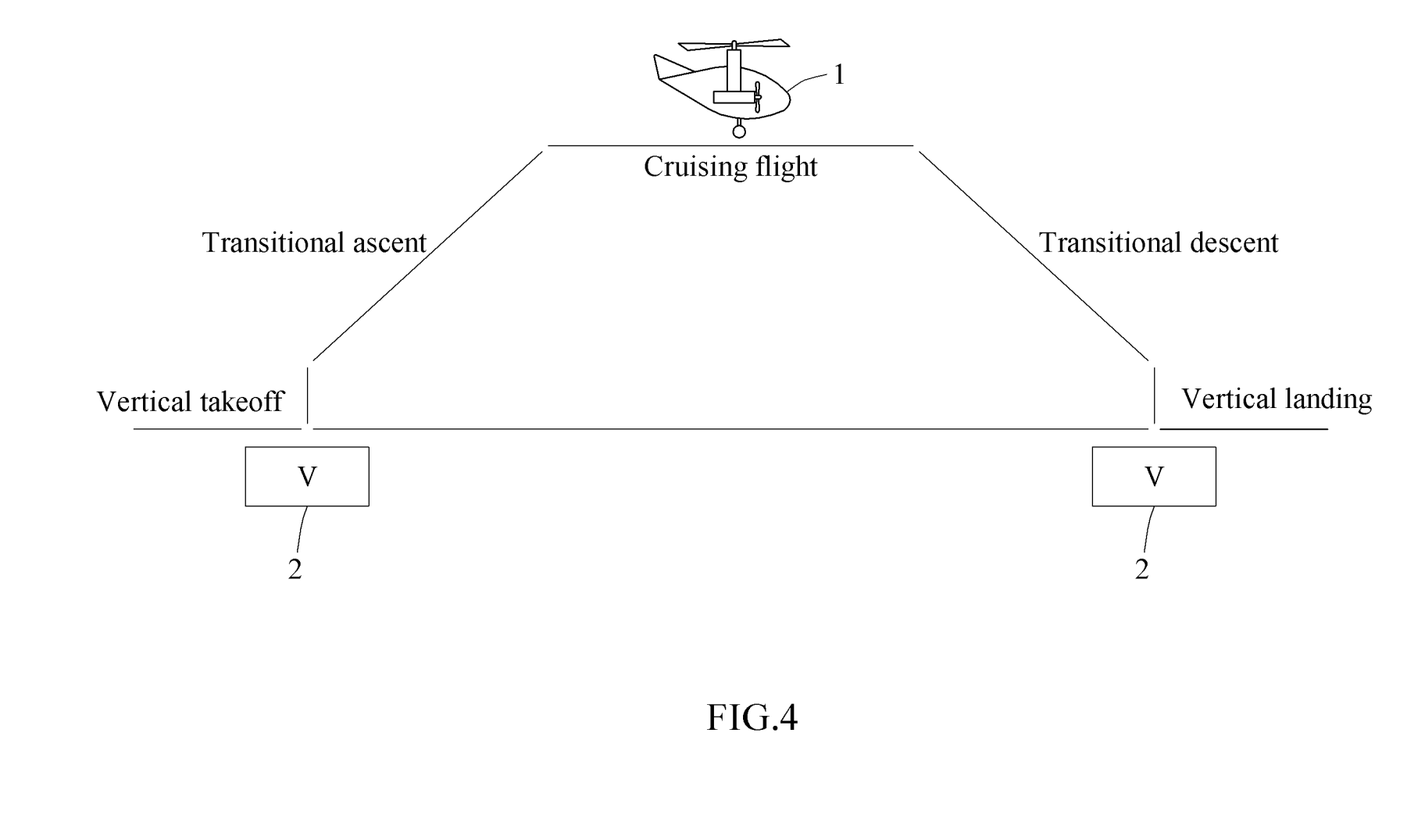
FIG. 4 is a diagram illustrating an example of a takeoff and landing operation of a VTOL flying object according to an example embodiment.

FIG. 4 is a diagram illustrating an example of takeoff and landing of the VTOL flying object 1 according to an example embodiment.

The VTOL flying object 1 flies such that it takes off and lands vertically, and thus may fly in a different pattern from a flight pattern of an existing flying object or aircraft. Referring to FIG. 4, when it takes off, the VTOL flying object 1 may take off vertically up to a predetermined height from the takeoff and landing port 2. Subsequently, when the VTOL flying object 1 reaches an optimal height (or an optimal altitude), for example, 50 feet (ft), the VTOL flying object 1 may then make a transitional ascending flight to gradually increase the height upward. The terms "height" and "altitude" are interchangeably used herein. Here, when the VTOL flying object 1 takes off vertically to a height greater than or equal to the optimal height, flight efficiency may rapidly decrease. Subsequently, when the VTOL flying object 1 reaches a predetermined height through the transitional ascending flight, the VTOL flying object 1 may make a cruise flight that flies straightly. Subsequently, when the VTOL flying object 1 approaches around a target location, the VTOL flying object 1 may then make a transitional descending flight that gradually lowers the height towards the takeoff and landing port 2. When the VTOL flying object 1 reaches a predetermined height above the takeoff and landing port 2, the VTOL flying object 1 may make a vertical landing flight toward the center of the takeoff and landing port 2. Here, when the VTOL flying object 1 lands vertically from a height greater than a predetermined height (e.g., 50 ft), flight efficiency may rapidly decrease.

According to an example, there are provided two types of lighting portion that indicate an optimal height or altitude when the VTOL flying object 1 makes the transitional descending flight and the vertical descending flight. That is, the altitude may be identified by the first lighting portion 110 when the VTOL flying object 1 makes the vertical descending flight, and by the second lighting portion 120 when the VTOL flying object 1 makes the transitional descending flight.

Figure 5:
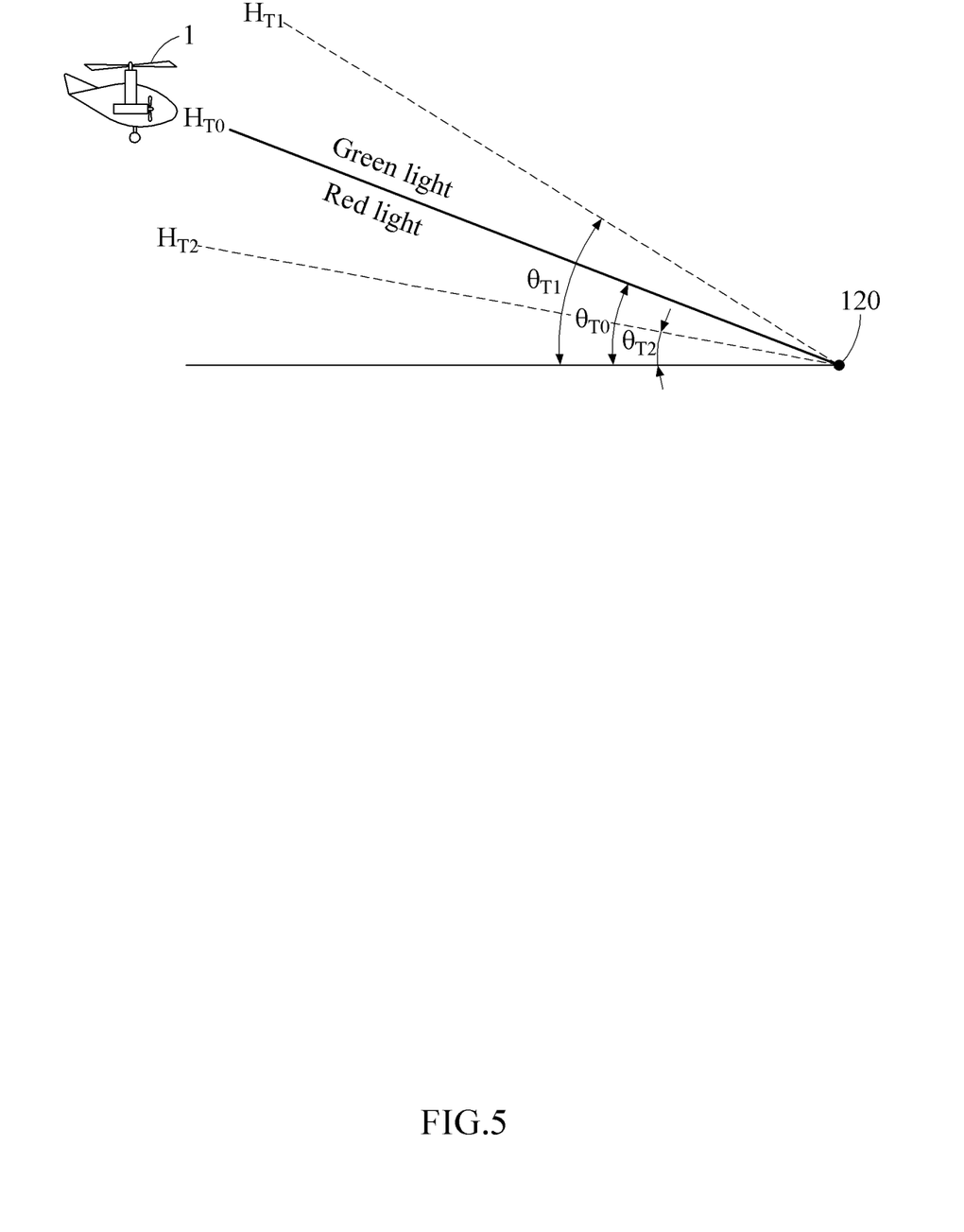
FIG. 5 is a diagram illustrating an example of verifying an optimal approach angle through a second lighting portion during a transitional descending flight of a VTOL flying object illustrated in FIG. 4.

FIG. 5 is a diagram illustrating an example of a transitional descending flight of the VTOL flying object 1 located in an externally upward direction of the takeoff and landing port 2 according to an example embodiment.

When the VTOL flying object 1 approaches the takeoff and landing port 2 during a transitional descending flight, it is possible to determine an optimal approach angle $\theta_{T0}$ by visually identifying the color of the second lighting portion 120. For example, the second lighting portion 120 may be indicated in green when the VTOL flying object 1 is transitionally descending at an angle $\theta_{T1}$ that is greater than the optimal approach angle $\theta_{T0}$, and be indicated in red when the VTOL flying object 1 is transitionally descending at an angle $\theta_{T2}$ that is less than the optimal approach angle $\theta_{T0}$. As illustrated in FIG. 5, the second lighting portion 120 may be indicated in red when the VTOL flying object 1 is at a point $H_{T2}$ that is lower than a point $T_{T0}$ corresponding to the optimal approach angle $\theta_{T0}$, and be indicated in green when the VTOL flying object 1 is at a point $H_{T1}$ that is higher than the point $H_{T0}$ corresponding to the optimal approach angle $\theta_{T0}$.

The optimal approach angle $\theta_{T0}$ may be set based on a surrounding environment of the takeoff and landing port 2, and the VTOL flying object 1 may safely move to the takeoff and landing port 2 based on the set optimal approach angle $\theta_{T0}$.

For example, in a case in which there is a building that is likely to collide with the VTOL flying object 1 nearby, setting the optimal approach angle $\theta_{T0}$ based on the height of the building may allow the VTOL flying object 1 to transitionally descend from higher than the set optimal approach angle $\theta_{T0}$ and thereby avoid a collision with the building.

Figure 6:
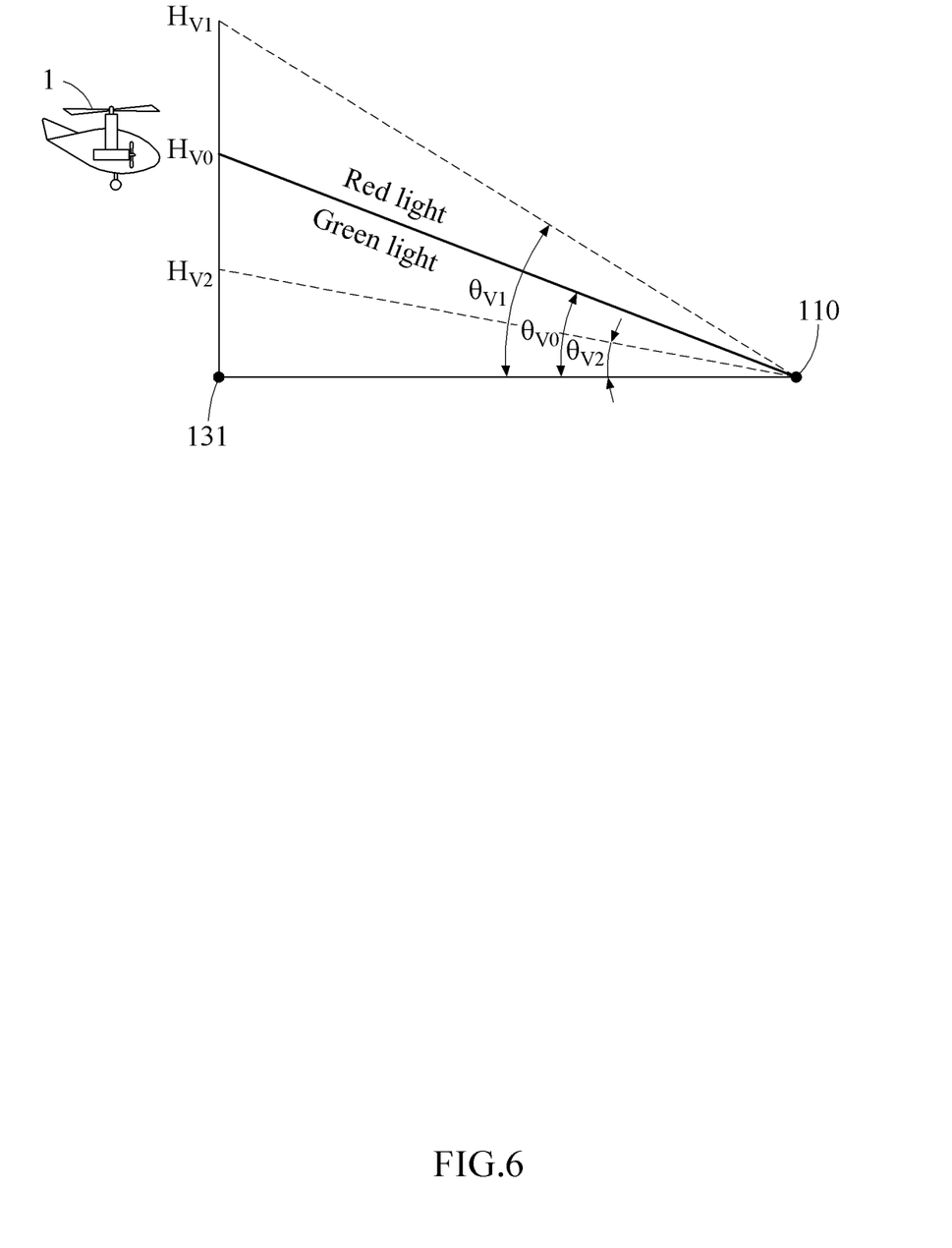
FIG. 6 is a diagram illustrating an example of verifying an altitude through a first lighting portion during a vertical descending flight of a VTOL flying object according to an example embodiment.

FIG. 6 is a diagram illustrating an example of a vertical descending flight of the VTOL flying object 1 according to an example embodiment.

A vertical descending and ascending flight may consume a great amount of energy of the VTOL flying object 1, and it is thus effective to change to a transitional flight at an optimal altitude. Thus, when the VTOL flying object 1 vertically descends and ascends, an accurate altitude may need to be measured. By identifying the color of the first lighting portion 110 when the VTOL flying object 1 is vertically descending, it is possible to determine an optimal altitude of the VTOL flying object 1.

The first lighting portion 110 may expose red light to the VTOL flying object 1 when an angle formed by a straight line connecting the VTOL flying object 1 and the first lighting portion 110 with respect to a horizontal plane is greater than or equal to a preset angle $\theta_{V0}$, and expose green light to the VTOL flying object 1 when this angle is less than or equal to the preset angle $\theta_{V0}$. For example, as illustrated in FIG. 6, when the VTOL flying object 1 is located lower than an optimal altitude or height $H_{V0}$, an angle $\theta_{V2}$ formed by the straight line connecting the VTOL flying object 1 and the first lighting portion 110 with respect to the horizontal plane may be less than the optimal angle $\theta_{V0}$ and the first lighting portion 110 may be indicated in green. In contrast, when the VTOL flying object 1 is located higher than the optimal altitude or height $H_{V0}$, an angle $\theta_{V1}$ formed by the straight line connecting the VTOL flying object 1 and the first lighting portion 110 with respect to the horizontal plane may be greater than the optimal angle $\theta_{V0}$ and the first lighting portion 110 may be indicated in red. Thus, based on the angle of the straight line connecting the VTOL flying object 1 and the first lighting portion 110, it is possible to set an optimal angle of the VTOL flying object 1 as described above.

In addition, in a case in which the VTOL flying object 1 does not land accurately on the center of the takeoff and landing port 2, the color of the first lighting portion 110 may be distorted. In such a case, the VTOL flying object 1 may not land at an optimal altitude and may thus be at risk of being out of balance. Thus, the landing guide 130 may be provided to guide the VTOL flying object 1 to vertically descend toward the center of the takeoff and landing port 2 accurately.

The landing guide 130 includes the dead center mark 131 and the takeoff and landing site identifying mark 132. Through the takeoff and landing site identifying mark 132 formed at the center of the takeoff and landing port 2, the VTOL flying object 1 may identify the center for landing before vertically descending and adjust the position of the VTOL flying object 1.

In addition, when a detector included in the VTOL flying object 1 detects the dead center mark 131 during the vertical descending flight, the landing guide 130 may allow the VTOL flying object 1 to automatically land at such a position.

According to an example embodiment described herein, the light aid 100 may visually verify an optimal approach angle through the second lighting portion 120 during a transitional descending flight of the VTOL flying object 1, and verify an optimal altitude through the first lighting portion 110 during a vertical descending flight of the VTOL flying object 1. In addition, when the VTOL flying object 1 is above the takeoff and landing port 2, the light aid 100 may allow the VTOL flying object 1 to land on the center of the takeoff and landing port 2 through the landing guide 130.

Further, the light aid 100 may set an optimal approach angle and an optimal altitude by adjusting an installation position of each of the first lighting portion 110 and the second lighting portion 120 in consideration of a surrounding environment of the takeoff and landing port 2. Also, the light aid 100 is simple in structure, and it is thus possible to easily install it anywhere in an urban area.

According to example embodiments described herein, an aeronautical light aid for a VTOL flying object may aid a VTOL flying object in safely landing by providing visual information when the VTOL flying object lands.

Effects of the aeronautical light aid may not be limited to what has been described above, and other effects that are not described herein may also be understood by one of ordinary skill in the art from the description provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An aeronautical light aid for a vertical takeoff and landing (VTOL) flying object, comprising:
   a plurality of first lighting portions buried in a takeoff and landing port and configured to radiate light in an upward direction;
   a plurality of second lighting portions provided outside the takeoff and landing port and configured to radiate light in an externally upward direction; and
   a landing guide provided at a center of the take-off and landing port,
   wherein each of the first lighting portions and the second lighting portions comprises:
   a lamp body;
   a light source provided in the lamp body and configured to radiate light;
   a filter disposed in front of the light source and configured to perform filtering on light generated from the light source;
   a first lens disposed in front of the filter and configured to allow light obtained through the filtering to transmit; and
   a second lens disposed in front of the first lens in a traveling direction of the light,
   wherein the filter comprises a green filter and a red filter to simultaneously provide green light and red light,
   wherein the green filter and the red filter are disposed on the same plane to equally divide in half the light generated from the light source.

2. The aeronautical light aid of claim 1, wherein the first lighting portions are installed such that red light is exposed to the flying object when a first angle is greater than or equal to a preset angle and green light is exposed to the flying object when the first angle is less than or equal to the preset angle,
   wherein the first angle is formed between a horizontal plane and a straight line connecting the flying object and the first lighting portions when the flying object is located above the takeoff and landing port.

3. The aeronautical light aid of claim 2, wherein the first lighting portions are arranged in a circle with the landing guide being at a center thereof.

4. The aeronautical light aid of claim 1, wherein the second lighting portions are installed such that green light is exposed to the flying object when a second angle is greater than or equal to a preset angle and red light is exposed to the flying object when the second angle is less than or equal to the preset angle,
   wherein the second angle is formed between a horizontal plane and a straight line connecting the flying object and the second lighting portions when the flying object is located above outside the takeoff and landing port.

5. The aeronautical light aid of claim 4, wherein the second lighting portions are disposed by being buried along a circumference of the takeoff and landing port, and configured to protrude from the ground or be received to the ground, based on an angle at which the flying object approaches.

6. The aeronautical light aid of claim 1, wherein the landing guide comprises:
   a dead center mark formed at a center point of the takeoff and landing port; and
   a takeoff and landing site indicating mark formed around the dead center mark and configured to visually indicate the center of the takeoff and landing port.

7. A flying object, comprising a detector, wherein, when the dead center mark of the aeronautical light aid of claim 6 is recognized by the detector, the landing guide of the aeronautical light aid is configured to guide the flying object to land at the center of the takeoff and landing port.

* * * * *